United States Patent [19]

Klemenhagen et al.

[11] Patent Number: 5,630,547

[45] Date of Patent: May 20, 1997

[54] SPRAYER BOOM SELF-LEVELING LOCKOUT AND METHOD OF SPRAYER BOOM OPERATION

[75] Inventors: David Klemenhagen, North Mankato; Robert J. Scheurer, Kasota, both of Minn.

[73] Assignee: Hiniker Company, Mankato, Minn.

[21] Appl. No.: 425,457

[22] Filed: Apr. 20, 1995

[51] Int. Cl.⁶ .................................................. B05B 3/02
[52] U.S. Cl. ........................ 239/161; 239/165; 239/168; 239/172; 406/146
[58] Field of Search ............................ 239/159, 161, 239/163, 165–8, 172; 403/146

[56] References Cited

U.S. PATENT DOCUMENTS

| 4,379,522 | 4/1983 | Elliott et al. | 239/167 |
|---|---|---|---|
| 4,598,830 | 7/1986 | Fletcher | 239/166 |
| 4,634,051 | 1/1987 | Dudley | 239/168 |
| 4,643,358 | 2/1987 | Jackson | 239/166 |
| 4,650,117 | 3/1987 | Dudley | 239/168 |
| 5,348,226 | 9/1994 | Heiniger et al. | 239/168 |
| 5,507,435 | 4/1996 | Benest | 239/167 |

OTHER PUBLICATIONS

Top Air A.T.S. Trailer Sprayer (1993) Top Air 60' Boom With Self Leveling & Hydraulic Fold.
Hiniker Parts Book For Century Sprayers: Drawing No. 2358 & Description — Drawing No. 2138 & Description — Drawing No. 2111 & Description Sep. 1990.

*Primary Examiner*—Andres Kashnikow
*Assistant Examiner*—Lisa Ann Douglas
*Attorney, Agent, or Firm*—Reising, Ethington, Barnard & Perry

[57] ABSTRACT

A sprayer boom assembly (14) includes a center boom (72), left inner and outer wing booms (100 and 106), and right inner and outer wing booms (110 and 116). A left wing hydraulic cylinder (120) pivots the left inner and outer wing booms (100 and 106) between a horizontal working position and a folded transport position. A right wing hydraulic cylinder (134) pivots the right inner and outer wing booms (110 and 116) between a horizontal working position and a folded transport position. The center boom (72) is pivotally attached to an intermediate frame (30) by a left leveling link (60) and a right leveling link (64). A left sprayer boom lock assembly (150) limits pivotal movement of the left and right leveling links (60 and 64) in a first direction when the left wing hydraulic cylinder (120) pivots the left inner wing (100) from a horizontal working position. A right sprayer boom lock assembly (152) limits pivotal movement of the left and right leveling links (60 and 64) in a second direction when the right wing hydraulic cylinder (134) pivots the right inner wing (110) from a horizontal working position. Valves (210, 212 and 214) control the supply of liquid chemicals to the nozzles (16).

5 Claims, 5 Drawing Sheets

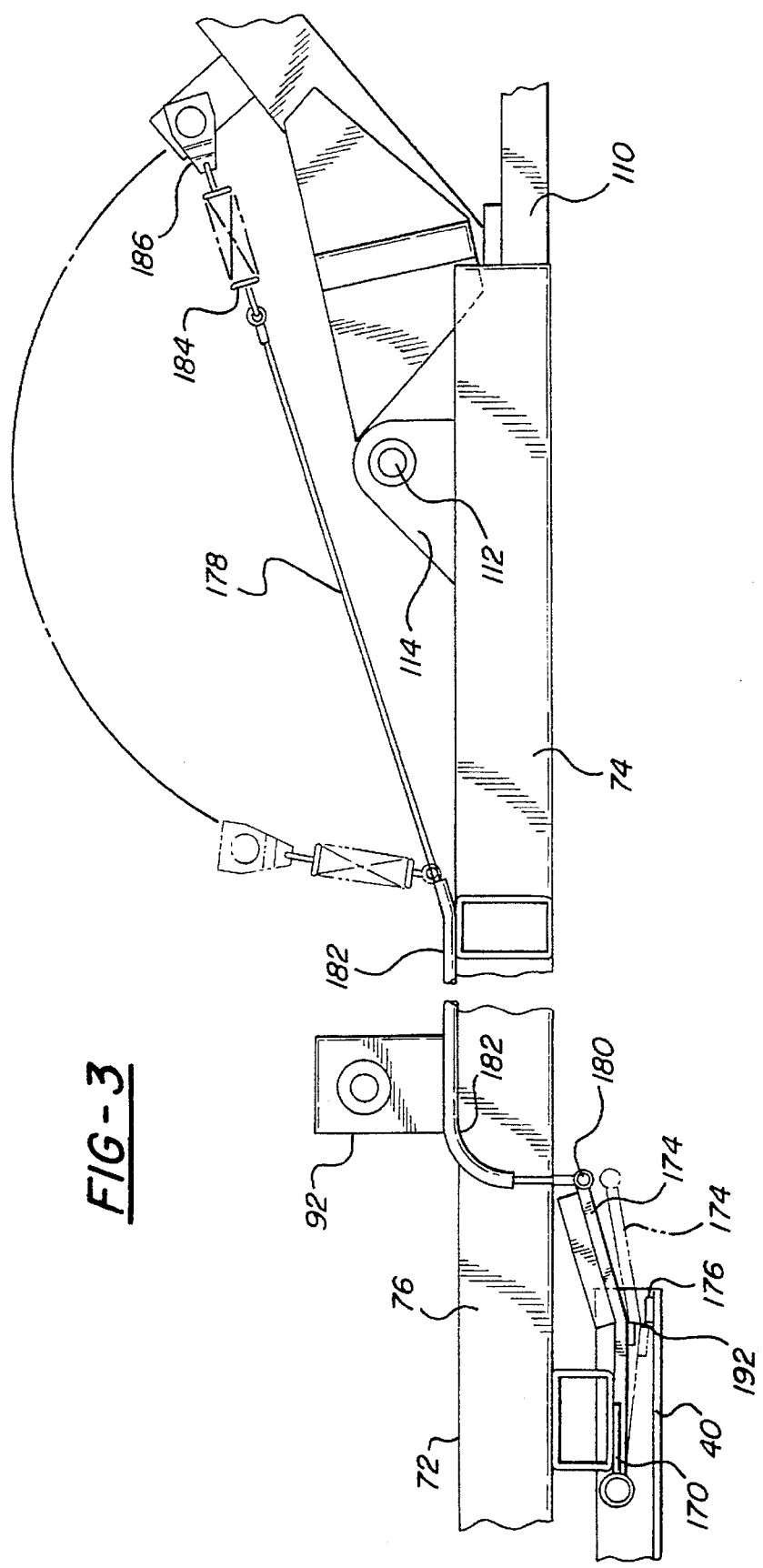

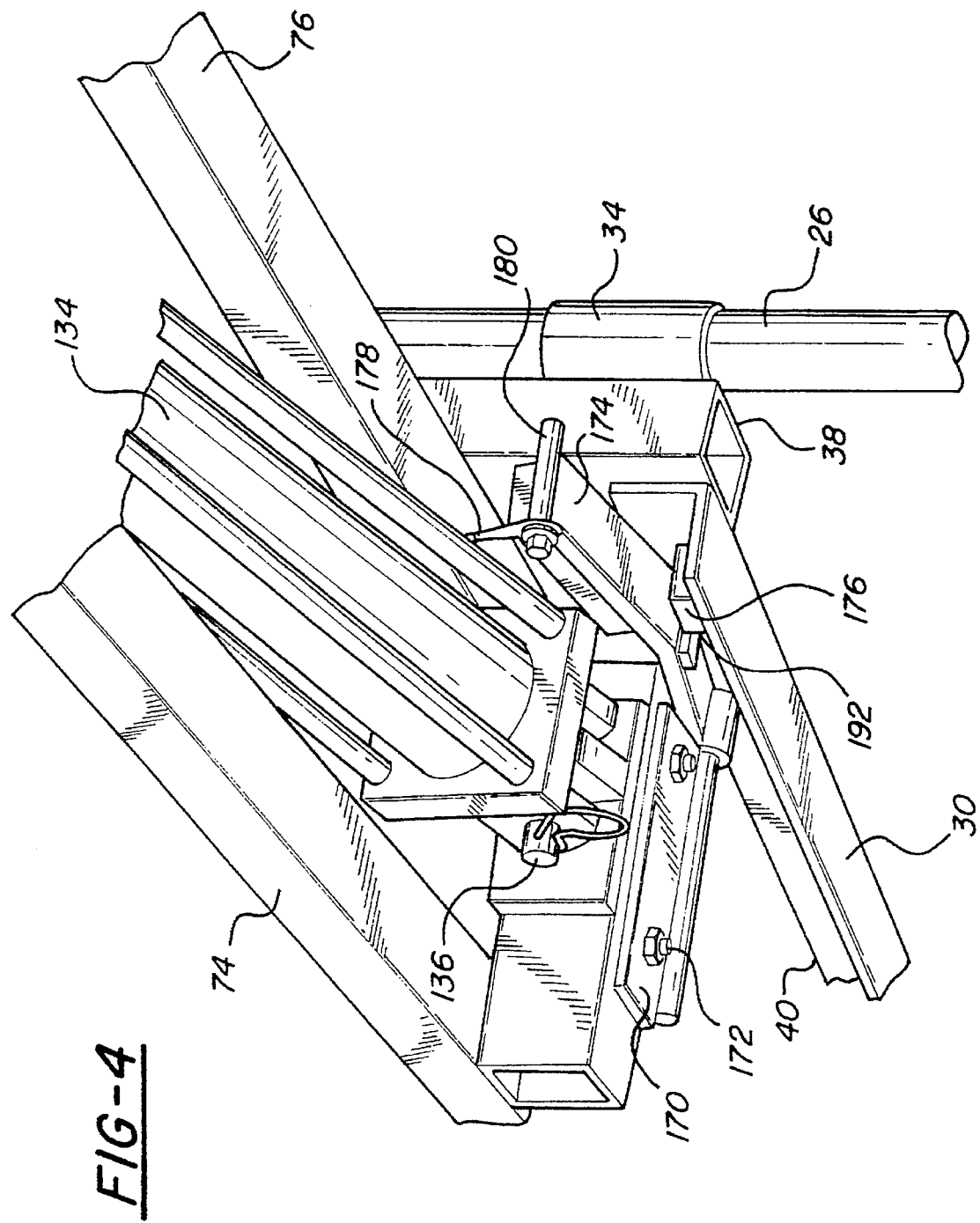

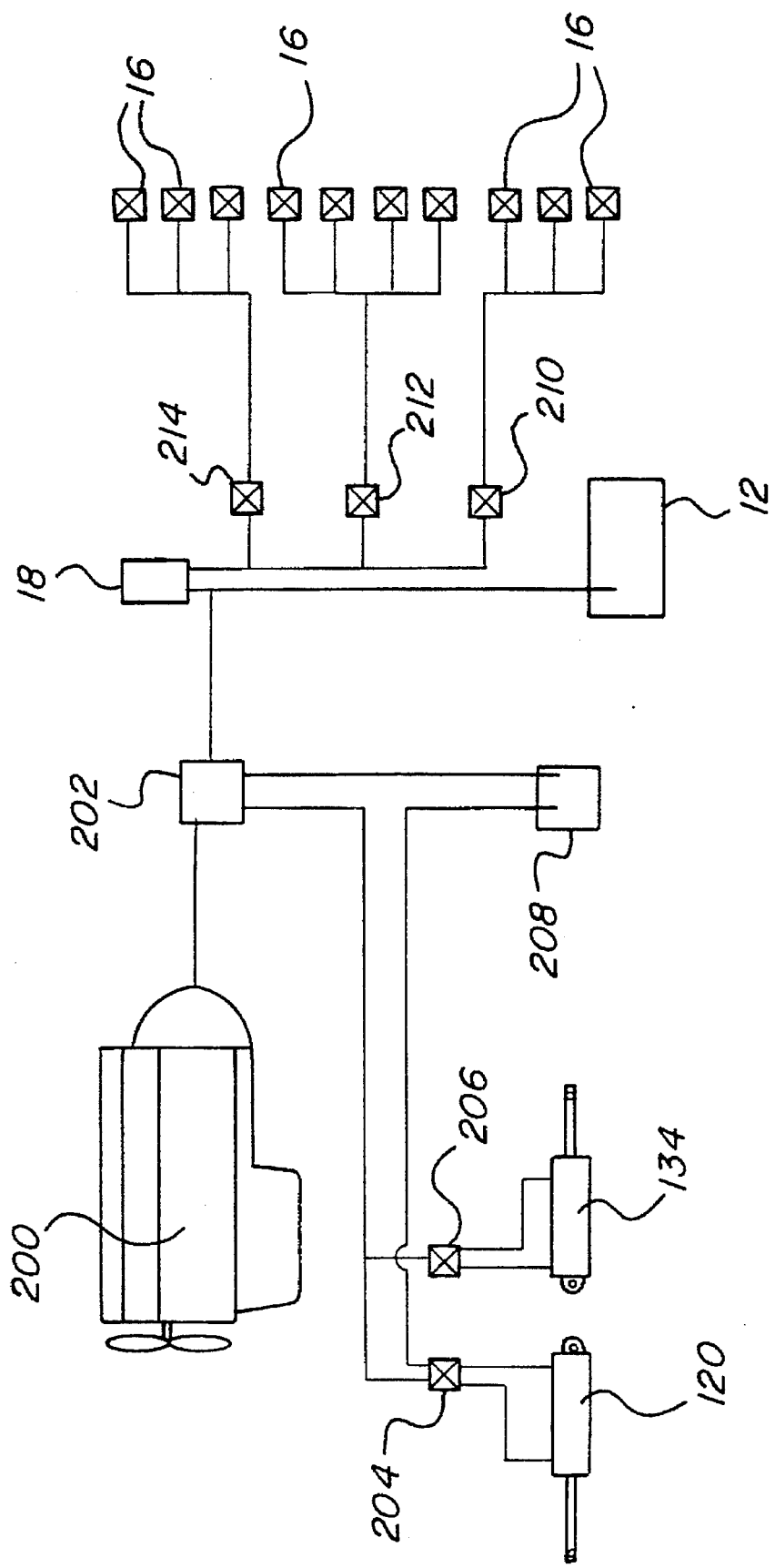

SPRAYER BOOM SELF-LEVELING LOCKOUT AND METHOD OF SPRAYER BOOM OPERATION

BACKGROUND OF THE INVENTION

1. Technical Field

This invention relates to agricultural sprayers with self-leveling booms and more particularly to a self-leveling boom lockout that limits movement of the boom relative to the boom support when a boom wing is raised.

2. Description of the Prior Art

Agricultural sprayers are used to spray herbicides, fungicides and insecticides on farm fields. The sprayers include a boom with a plurality of nozzles spaced along the length of the boom. The boom can be mounted directly on a tractor, on a trailer with a chemical tank that is pulled by a tractor or other vehicle, on a chemical tank transported by a vehicle or on a special self propelled sprayer platform.

Sprayer booms are available that apply chemicals to a strip that can be 40 feet, 50 feet, 60 feet or even wider during each pass through a field. Booms that cover such wide strips have foldable wings that can be folded when transported from one field to another. The booms are also foldable to clear various obstructions in or around a field.

Nozzles, mounted on sprayer booms for dispensing liquid chemicals, spray liquid in a conical or triangular pattern that extends downward from each nozzle toward the ground. The apex of the cone or triangle is at the nozzle. If a nozzle is close to the ground, it will apply chemicals in a relatively narrow band as the boom moves through the field. With the nozzles close to the ground, they must be spaced close together along the length of the boom or the relative narrow bands of chemicals will be spaced apart and the portion of the field surface between two adjacent bands will not receive a chemical treatment. With the nozzles high above the ground chemicals will be applied in overlapping bands unless the nozzles are spaced far apart along the length of the boom. The strips of the field where the bands from adjacent nozzles overlap may receive an excessive chemical treatment or the strips of the field where the bands do not overlap may receive inadequate chemical treatment.

The surface of agricultural fields tends to be at least slightly uneven and rough. The surface also tends to be relatively soft in some areas and relatively hard in other areas. As a spray boom carrier moves across a field, wheels and tires which are generally about eight feet or so apart will move up over high portions of rough areas, move down into low portions of rough areas and sink into soft areas. This results in a spray boom carrier oscillating back and forth about axies parallel to the direction of travel. A small oscillation about axies parallel to the direction of movement will result in large vertical movements of the ends of a long boom. The up and down movements of boom ends will cause uneven chemical application due to change in the distance between the nozzles and the ground.

Self leveling booms were developed to let the boom carrier rock back and forth while the boom remains stable and somewhat stationary. The self leveling systems work well in the field. However, the system leaves the boom unstable during road transport with the boom wings folded. Self leveling systems also allow an extended side of a boom to drop to the ground when the other side is folded and raised.

Transport locks have been used with self-leveling booms to stabilize a boom during movement when in a folded condition. These transport locks are pins that are inserted manually to prevent movement of links that provide self-leveling. To insert or remove these pins the operator has to stop the tractor propelling the sprayer, move around behind the sprayer boom to insert or remove the pin and then return to the tractor.

SUMMARY OF THE INVENTION

An object of the invention is to provide a self-leveling sprayer boom lock that is engaged when a boom is folded to a transport position and that is automatically disengaged when a boom is unfolded to a working position.

Another object of the invention is to provide a sprayer boom lock which is automatically engaged, when one wing is folded, to limit downward movement of the unfolded wing and at the same time allow the unfolded wing to move upward over an obstruction.

A further object of the invention is to provide a pair of boom locks which both automatically engage when both sprayer boom wings are folded to transport positions and which automatically disengage when both sprayer boom wings are unfolded to working positions.

A sprayer boom assembly includes a fixed frame, a vertically adjustable intermediate frame, a center boom and at least two folding wing booms pivotally connected to the center boom. The fixed frame is rigidly connected to a trailer, a tractor or to some other vehicle. The fixed frame includes two spaced apart vertical guide bars. The vertically adjustable intermediate frame is connected to the two spaced apart vertical guide bars. If desired a hydraulic cylinder can be connected to the fixed frame and to the vertically adjustable frame. The hydraulic cylinder receives fluid from a pump to move the vertically adjustable frame along the vertical guide bars to a desired vertical position.

The sprayer center boom is pivotally attached to a pair of spaced apart leveling links. The leveling links are also pivotally attached to the vertically adjustable intermediate frame. The leveling links provide a horizontal apparent pivot axis for the sprayer center boom that is above the center boom and parallel to the usual direction of movement of the sprayer. A folding wing is pivotally attached to each end of the center boom. Hydraulic cylinders are attached to the center boom and to each folding wing to pivot the folding wings between a generally horizontal working position and a folded transport position. A pair of self-leveling sprayer boom locks for limiting movement of the center boom relative to the vertically adjustable frame are pivotally attached to the center boom. Fixed stops are provided on the vertically adjustable intermediate frame that are engagable by the boom locks. A right side cable is attached to one of the boom locks and to the right folding wing boom. The right side cable holds a boom lock out of engagement with a fixed stop, when the right folding wing boom is in a generally horizontal working position. When the right folding wing boom is raised toward a transport position, the right side cable lowers a boom lock into a position in which a fixed stop can be engaged to limit pivotal movement of the leveling links in one direction and limit downward movement of the folding wing boom on the left end of the center boom.

A left side cable is attached to the other boom lock and to the left folding wing boom. The left side cable holds the boom lock to which it is attached out of engagement with a fixed stop when the left folding wing boom is in a generally horizontal working position. When the left folding wing boom is raised toward a transport position, the left side cable lowers the other boom lock into a position in which a fixed stop can be engaged by a boom lock and limit pivotal movement of the leveling links in one direction and thereby limit downward movement of the folding wing boom on the right end of the center boom.

The forgoing and other objects, features and advantages of the present invention will become apparent in the light of the following detailed description of an exemplary embodiment thereof, as illustrated in the accompanying drawing.

BRIEF DESCRIPTION OF THE DRAWING

FIG. 3 is an enlarged rear elevation view of the right sprayer boom lock assembly with parts removed and parts broken away;

FIG. 4 is an enlarged perspective view of the right sprayer boom lock assembly right latch and the right latch contact surface; and FIG. 5 is a control system schematic.

Figure 1:
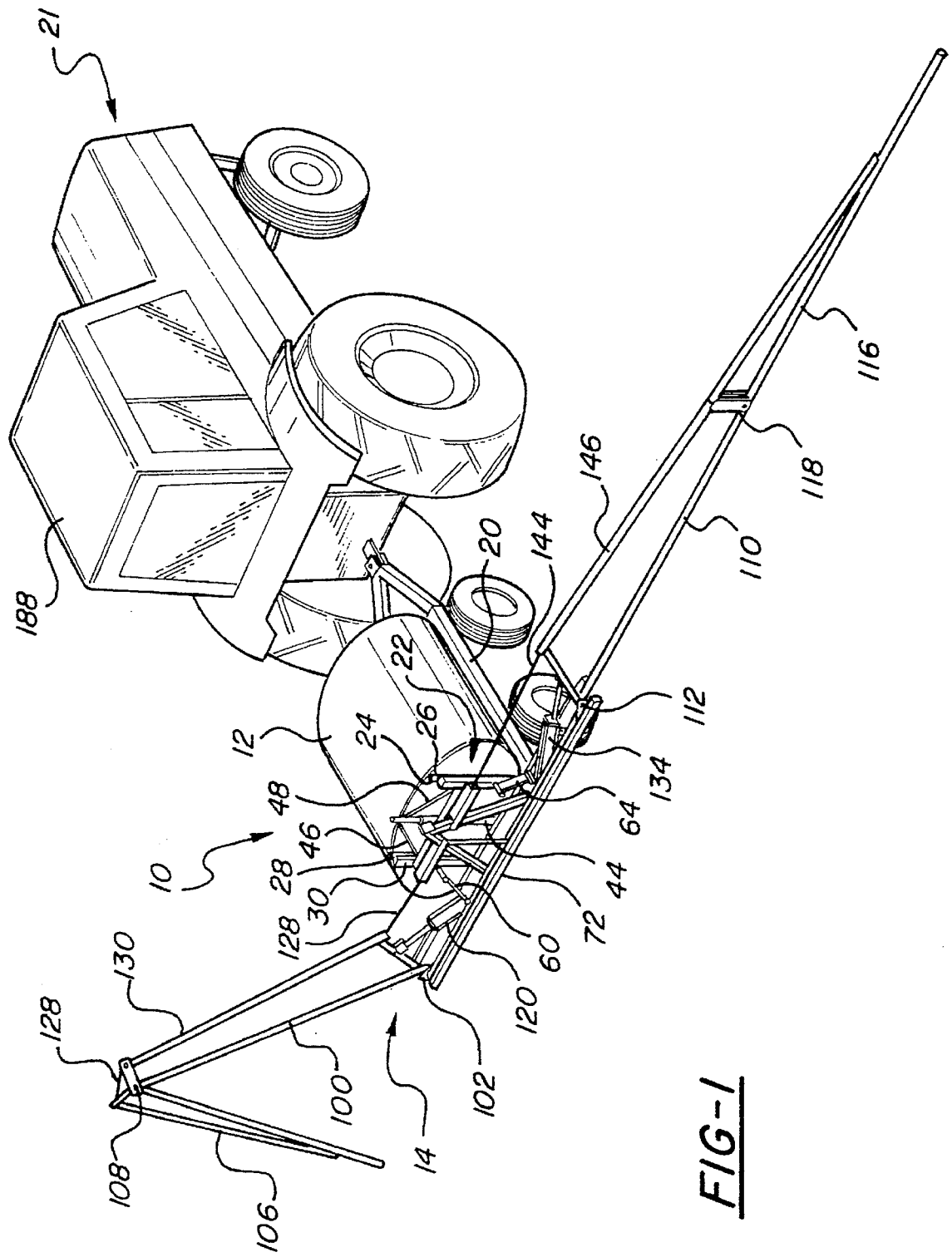
FIG. 1 is a perspective view of a sprayer boom attached to a trailer pulled by a tractor with the left wing boom partially folded to a transport position.
Figure 2:
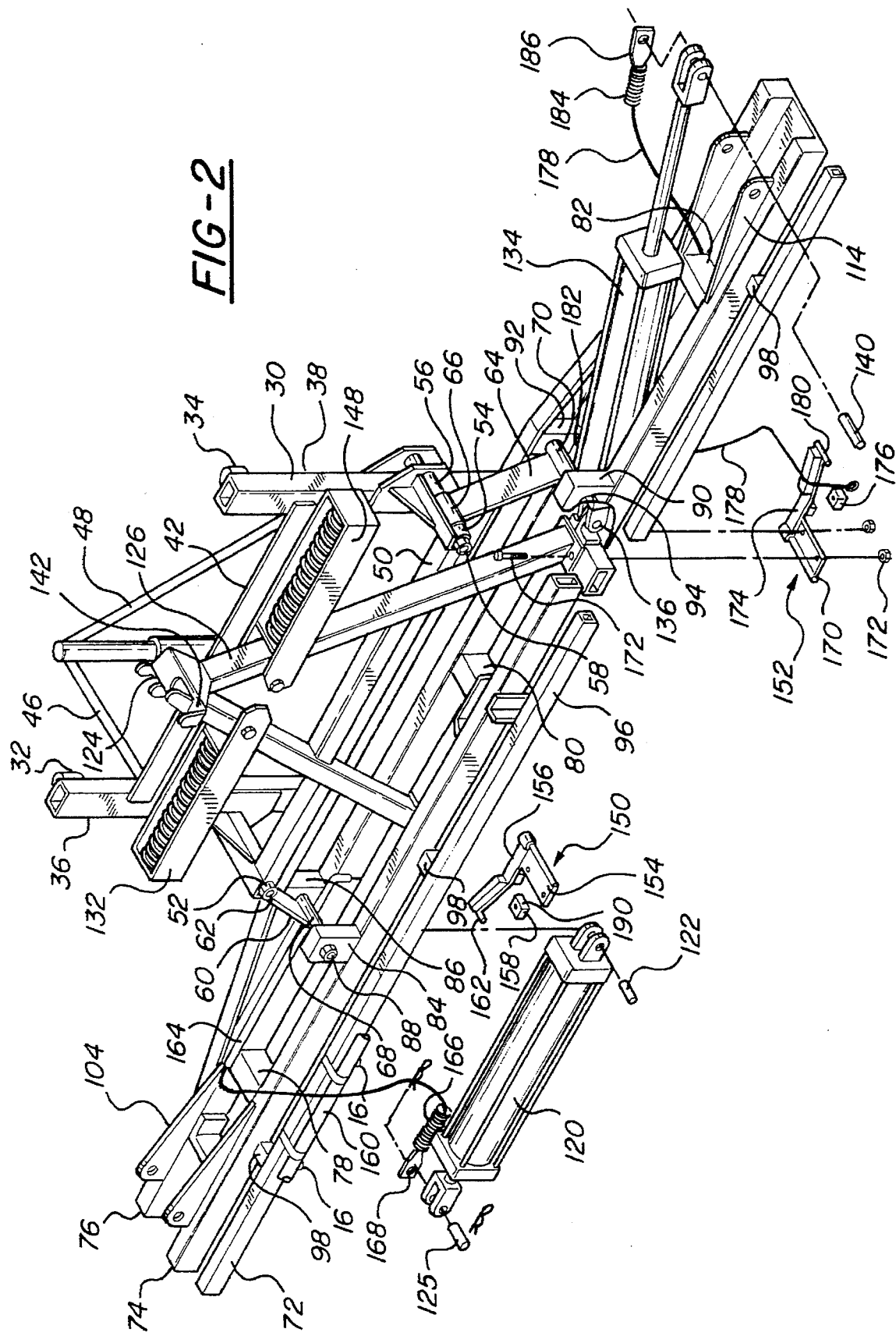
FIG. 2 is an enlarged expanded perspective view of the intermediate frame, the center boom and the hydraulic cylinders for folding the wing booms.

Agricultural sprayers 10 have a tank 12 for liquid chemicals, a sprayer boom assembly 14 with nozzles 16 and a pump 18 to pump liquid from the tank and supply it to the nozzles under pressure. These sprayer components can be mounted on a trailer 20 that is towed by a tractor 21, mounted directly on a tractor, mounted on a special self-propelled sprayer platform or mounted on a skid unit that can be transported by a vehicle such as a truck.

The sprayer boom mounting assembly 22, as shown in FIG. 1, includes a fixed frame 24 that can be attached to a trailer 20, a skid, a tractor 21 or other structure. The fixed frame 24 has a pair of vertical guide bars 26 and 28. A vertically adjustable intermediate frame 30 includes two vertical members 36 and 38 that are secured to the vertical guide bars 26 and 28 by bearing members 32 and 34. A lower horizontal cross bar 40 and an upper horizontal cross bar 42 are secured to both vertical members 36 and 38. A hydraulic cylinder 44 has its head end connected to the fixed frame 24 and its rod end attached to two straps 46 and 48 with free ends attached to the upper ends of the vertical members 36 and 38 of the vertically adjustable intermediate frame 30. Pumping hydraulic fluid into the hydraulic cylinder 44 will slide the bearing members 32 and 34 upwardly along the two vertical guide bars 26 and 28 of the fixed frame 24 and raise the intermediate frame 30. Retracting the hydraulic cylinder 44 slides the bearing members 32 and 34 downwardly along the two vertical guide bars 26 and 28 and lowers the intermediate frame 30.

A leveling link support assembly 50 is secured to the vertical members 36 and 38 of the intermediate frame 30. The leveling link support assembly 50 has spaced apart sleeves (not shown) that receive and retain a left side pivot bolt 52 and two spaced apart sleeves 54 and 56 that receive and retain a right side pivot bolt 58. The left and right side pivot bolts 52 and 58 provide horizontal leveling link upper pivot axies that are parallel to the normal direction of movement of the sprayer 10 across a field.

A left leveling link 60 has an upper end 62 that is received between the spaced apart sleeves of the leveling link support assembly 50. The upper end 62 of the left leveling link 60 has a bore that receives the left side pivot bolt 52. The right leveling link 64 has an upper end 66 that is received between the spaced apart sleeves 54 and 56 of the leveling link support assembly 50. The upper end 66 of the right leveling link 64 has a bore that receives the right side pivot bolt 58. The spaced apart sleeves 54 and 56 limit fore and aft movement of the left and right leveling links 60 and 64 while leaving the left leveling link free to pivot about the upper pivot axis of the left side pivot bolt 52 and leaving the right leveling link free to pivot about the upper pivot axis of the right side pivot bolt 58. The lower end 68 of the left leveling link 60 has a bore and the lower end 70 of the right leveling link 64 has a bore.

The center boom 72 of the sprayer boom assembly 14 has a frame with two elongated, parallel, horizontal spaced apart rectangular tubes 74 and 76 that are connected together by cross members 78, 80 and 82. A pair of left side mounting blocks 84 and 86 are secured to the rectangular tubes 74 and 76. A pivot bolt 88 passes through the left side mounting block 86, the bore in the lower end 68 of the left leveling link 60 and through the left side mounting block 84 and is retained in place by a nut. The pivot bolt 88 forms a left lower pivot axis. A pair of right side mounting blocks 90 and 92 are secured to the rectangular tubes 74 and 76. A pivot bolt 94 passes through the right side mounting block 92, the bore in the lower end 70 of the right leveling link 64 and through the right side mounting block 90 and is retained in place by a nut. The pivot bolt 94 forms a right lower pivot axis. The left lower pivot axis formed by the pivot bolt 88 and the right lower pivot axis formed by the pivot bolt 94 are spaced apart a distance that is greater than the distance between the upper pivot axis of the left side pivot bolt 52 and the upper pivot axis of the right side pivot bolt 58. With this geometry, the left leveling link 60 and the right leveling link 64 form an apparent pivot axis above the two leveling links at a point where a line through the left lower pivot axis of the pivot bolt 88 and the upper pivot axis of the left side pivot bolt 52 is intersected by a line through the right lower pivot axis of the pivot bolt 94 and the upper pivot axis of the right side pivot bolt 58. Movement of the fixed frame 24 about a horizontal axis parallel to the direction of travel of the sprayer will cause the center boom 72 to pivot about apparent pivot axis relative to the fixed frame. Nozzles 16 are supported by a center nozzle support 96 attached to the rear of the rectangular tube 74 of the center boom 72 by a plurality of spacers 98.

A left inner wing boom 100 is pivotally attached to one end of the center boom 72 by a horizontal left inner wing pivot pin 102 that passes through a left hinge assembly 104 welded to the rectangular tubes 74 and 76 on the left end of the center boom 72. A left outer wing boom 106 is pivotally attached to the outer end of the left inner wing boom 100 by a left outer wing pivot pin 108. A right inner wing boom 110 is pivotally attached to another end of the center boom 72 by a horizontal right inner wing pivot pin 112 that passes through a right hinge assembly 114 welded to the rectangular tubes 74 and 76 on the right end of the center boom 72. A right outer wing boom 116 is pivotally attached to the outer end of the right inner wing boom 110 by a right outer wing pivot pin 118.

A left wing hydraulic cylinder 120 has its head end attached to the center boom 72 by a pin 122 and its rod attached to the left inner wing by a pin 125. Retraction of the left wing hydraulic cylinder 120 will pivot the left inner wing boom 100 about the left inner wing pivot pin 102 and move the left inner wing boom 100 from a working position to a transport position where it rests on a stop plate 124 on an A-frame 126 bolted to the center boom. A left outer wing boom 106 pivots about the left outer wing pivot pin 108 under the force of gravity as the left inner wing boom 100 is pivoted from a working position to a transport position. A left outer wing cable 128 is attached to the left outer wing boom 106 at a location spaced from the left outer wing pivot pin 108, extends through an upper truss tube 130 of the left inner wing boom 100 and is connected to a spring assembly 132 attached to the A-frame 126 on the center boom 72. Extending the left wing hydraulic cylinder 120 pivots the left inner wing boom 100 from the transport position toward the working position. As the left inner wing boom 100 moves toward the working position, the left outer wing cable 128 pivots the left outer wing boom 106 relative to the left inner wing boom 100 until both booms are in a generally common plane. Normally the inner wing boom 100 and the outer wing boom 106 extend outwardly and upwardly at an angle from the center boom 72 when in a working position. They could, however, be in the same plane as the center boom 72, if desired.

A right wing hydraulic cylinder 134 has its head end attached to the center boom 72 by a pin 136 and its rod attached to the right inner wing boom 110 by a pin 140. Retraction of the right wing hydraulic cylinder 134 will pivot the right inner wing boom 110 about the right inner wing pivot pin 112 and move the right inner wing boom from a working position to a transport position where it rests on a stop plate 142 on the A-frame 126 bolted to the center boom. A right outer boom 116 pivots about the right outer wing pivot pin 118 under the force of gravity as the right inner wing boom 110 is pivoted from a working position to a transport position. A right outer wing cable 144 is attached to the right outer wing boom 116 at a location spaced from the right outer wing pivot pin 118, extends through an upper truss tube 146 of the right inner wing boom 110 and is connected to a spring assembly 148 attached to the A-frame 126 on the center boom 72. Extending the right wing hydraulic cylinder 134 pivots the right inner wing from he transport position toward the working position. As the right inner wing boom 110 moves toward the working position, the right outer wing cable 144 pivots the right outer wing boom 116 relative to the right inner wing boom 110 until both booms are in a generally common plane. Normally the inner wing boom 110 and the outer wing boom 116 extend outwardly and upwardly at an angle from the center boom 72 when in a working position. The inner and outer wing booms 110 and 116 could, however, be in the same plane as the center boom 72, if desired.

The left inner wing boom 100 and the right inner wing boom 110 are slightly offset relative to each other so that in the transport position, the left inner wing boom is forward of the right inner wing boom where both inner wing booms are supported by the A-frame 126. The offset can be obtained by slightly changing the angle of the left inner wing pivot pin 102 relative to the right inner wing pivot pin 112. The offset can also be obtained by moving one inner wing forward relative to the center boom 72 and moving the other inner wing rearward relative to the center boom.

A left sprayer boom lock assembly 150 and a right sprayer boom lock assembly 152 are attached to the sprayer boom assembly 14. The left sprayer boom lock assembly 150 includes a latch pivot bracket 154 attached to the center boom 72 by bolts. A pivoted latch block 156 is attached to and pivotally supported by the latch pivot bracket 154. A fixed latch block 158 is attached to the lower horizontal crossbar 40 of the vertically adjustable intermediate frame 30 in a position in which it can be engaged by the pivotal latch block 156 of the left sprayer boom lock assembly 150.

The left pivoted latch block 156 has substantial mass. The force of gravity tends to pivot the left pivoted latch block 156 about a horizontal axis and move the pivoted latch block into a position in which the pivot latch block can engage the fixed latch block 158. A flexible cable 160 is attached to the left pivoted latch block 156 by a pin 162 at a position spaced from the latch pivot bracket 154. The flexible cable 160 extends from the left pivoted latch block 156, through a guide tube 164 welded to the center boom 72, and to the pin 125 that attaches the rod of the left wing hydraulic cylinder 120 to the left inner wing boom 100. The flexible cable 160 is attached to a tension spring 166. The tension spring 166 is attached to a cable bracket 168 that is pivotally retained by the pin 125. The tension spring 166 prevents cable damage when the left pivoted latch block 156 is not free to pivot relative to the latch pivot bracket 154.

Retraction of the left wing hydraulic cylinder 120 to raise the left inner wing boom 100 toward a transport position allows the left pivoted latch block 156 to pivot downward under the force of gravity, pull flexible cable 160 from the guide tube 164 and move into a position in which the pivot latch block 156 can engage the fixed latch block 158 and limit downward movement of the right inner wing boom 110. Extending the left wing hydraulic cylinder 120 to lower the left inner wing boom 100 to a working position, pulls the left pivoted latch block 156 up to a position in which the pivot latch block will not engage the fixed latch block 158 and the right inner wing boom 110 is free to move downward as a result of pivotal movement of the left and right leveling links 60 and 64.

The right sprayer boom lock assembly 152 includes a latch pivot bracket 170 attached to the center boom 72 by bolts 172. A pivoted latch block 174 is attached to and pivotally supported by the latch pivot bracket 170. A fixed latch block 176 is attached to the lower horizontal cross bar 40 of the intermediate frame 30 in a position in which it can be engaged by the pivoted latch block 174 of the right sprayer boom lock assembly 152. The right pivoted latch block 174 has substantial mass. The force of gravity tends to pivot the right pivoted latch block 174 about a horizontal axis and move the pivoted latch block into a position in which the pivot latch block can engage the fixed latch block 176. A flexible cable 178 (shown in FIG. 3) is attached to the right pivoted latch block 174 by a pin 180 at a position spaced from the latch pivot bracket 170. The flexible cable 178 extends from the right pivoted latch block 174, through a guide tube 182 welded to the center boom 72, and to the pin 140 that attaches the rod of the right wing hydraulic cylinder 134 to the right inner wing 110. The flexible cable 178 is attached to a tension spring 184. The tension spring 184 is attached to a cable bracket 186 that is pivotally retained by the pin 140. The tension spring 184 prevents cable damage when the right pivoted latch block 174 is not free to pivot relative to the latch pivot bracket 170.

Retraction of the right wing hydraulic cylinder 134 to raise the right inner wing boom 110 toward a transport position allows the right pivoted latch block 174 to pivot downward under the force of gravity, pull flexible cable 178 from the guide tube 182 and move into a position in which the right pivoted latch block can engage the fixed latch block 176 and limit downward movement of the left inner wing boom 100. Extending the right wing hydraulic cylinder 134 to lower the right inner wing boom 110 to a working position, pulls the right pivoted latch block 174 up to a position in which the right pivoted latch block will not engage the fixed latch block 176 and the left inner wing boom 100 is free to move downward as a result of pivotal movement of the left and right leveling links 60 and 64.

During operation of a sprayer with the sprayer boom assembly 14 described above the operator of a tractor 21 or other power source for propelling the sprayer boom assembly can hydraulically fold and raise the folding wing boom 100 or 110 on one side or the folding wing booms on both sides of a spray boom assembly from the tractor cab 188. If the folding wing boom 100 or 110 on one side only, is raised, a pivoted latch block 156 or 174 is automatically activated to limit downward movement of the folding wing boom on the other side. Limiting downward movement of the folding wing boom 100 or 110 on one side of the center boom 72 limits movement of the left and right leveling links 60 and 64 in one direction.

The left or right sprayer boom lock assembly 150 or 152, when engaged, limits downward movement of the folding inner wing boom 100 or 110 that is in a working position while allowing the folding wing boom to move upward from the working position and over an obstruction. Folding and raising both folding inner wing booms 100 and 110 will engage both pivoted latch blocks 156 and 174 with left and right latch contact surfaces 190 and 192 on the fixed latch blocks 158 and 176 and essentially prevent movement of the intermediate frame 30 and the center boom 72 relative to each other. The prevention of movement between the intermediate frame 30 and the center boom 72 blocks the left and right leveling links 60 and 64 thereby eliminating self leveling.

The control system as shown in FIG. 5 includes an engine 200 in the tractor 21 that drives a hydraulic pump 202 and a pump 18 for pumping liquid chemicals. The hydraulic pump 202 supplies hydraulic fluid to a left control valve 204 and a right control valve 206. The left control valve 204 directs hydraulic fluid from the hydraulic pump 202 to either the head end or the rod end of the left wing hydraulic cylinder 120 to change the position of the left inner wing boom 100. The left control valve 204 simultaneously directs hydraulic fluid to the sump 208 from the end of the left wing hydraulic cylinder 120 that is not receiving hydraulic fluid from the hydraulic pump 202. The left control valve 204 can also block the flow of hydraulic fluid to and from the left wing hydraulic cylinder 120 when the left inner wing boom 100 is in the desired position. The right control valve 206 directs hydraulic fluid from the hydraulic pump 202 to either the head end or the rod end of the right wing hydraulic cylinder 134 to change the position of the right inner wing boom 110. The right control valve 206 simultaneously directs hydraulic fluid to the sump 208 from the end of the right wing hydraulic cylinder 134 that is not receiving hydraulic fluid from the hydraulic pump 202. The left and right control valves 204 and 206 are controlled from the tractor cab 188.

The pump 18 pumps liquid chemicals from the tank 12 and supplies the liquid chemicals under pressure to a left valve 210, a center valve 212 and a right valve 214. The left valve 210 supplies liquid chemicals under pressure to nozzles 16 on the left inner wing boom 100 and the left outer wing boom 106. The center valve 212 supplies liquid chemicals under pressure to nozzles 16 on the center boom 72. The right valve 214 supplies liquid chemicals under pressure to nozzles 16 on the right inner wing boom 110 and the right outer wing boom 116. The left, center and right valves 210, 212 and 214 are preferably controllable from the tractor cab 188 and allow the tractor operator to stop the flow of liquid to the nozzles 16 on one of the inner wing booms 100 or 110 and the pivotally attached outer wing boom 106 or 116 when the inner wing boom and the outer wing boom are in a folded transport position. The operator can elect to supply liquid chemicals to the nozzles 16 through one of the valves 210, 212 and 214, through any two of the valves or through all three of the valves.

The above arrangement of the plumbing, the nozzles 16 and the valves 210, 212 and 214 is only one of several possible arrangements. The center boom 72 is substantially shorter than an inner wing boom 100 or 110 and an outer wing boom 106 or 116. The nozzles 116 controlled by the valve 212 can include some nozzles on the inner portions of the left inner wing boom 100 and the right inner wing boom 110 so that each of the valves 210, 212 and 214 supply fluid to about the same number of nozzles. With this arrangement the valve 212 must be in the off position when either wing boom 100 or 110 is folded to a transport position. Another possible plumbing arrangement would be one with two valves, each of which supplies fluid to all the nozzles on one side of the center boom 72.

The preferred embodiment of the invention has been described in detail but is an example only and the invention is not restricted thereto. It will be easily understood by those skilled in the art that modifications and variations can easily be made within the scope of this invention.

We claim:

1. A sprayer boom assembly including an intermediate frame adapted to be attached to a sprayer boom carrier; a center boom having a left end and a right end, a left wing boom pivotally connected to the left end of the center boom for pivotal movement about a generally horizontal axis between a left wing working position and a left wing folded transport position and a right wing boom pivotally connected to the right end of the center boom for pivotal movement about a generally horizontal axis between a right wing working position and a right wing folded transport position; a left leveling link with an upper end pivotally connected to the intermediate frame for pivotal movement about a left upper axis and a lower end pivotally connected to the center boom for pivotal movement about an axis that is parallel to the left upper axis; a right leveling link with an upper end pivotally connected to the intermediate frame for pivotal movement about a right upper axis that is spaced from the left upper axis and a lower end pivotally connected to the center boom for pivotal movement about an axis that is parallel to the right upper axis and spaced from the axis of the pivotal connection between the lower end of the left leveling link and the center boom; a left hydraulic cylinder pivotally attached to the center boom and to the left wing for pivoting the left wing between the left wing working position and the left wing folded transport position; a right hydraulic cylinder pivotally attached to the center boom and to the right wing for pivoting the right wing between the right wing working position and the right wing folded transport position; a left sprayer boom lock assembly including a left latch, a left latch contact surface engagable by the left latch to limit pivotal movement of the left and right leveling links in a direction which lowers the right end of the center boom while leaving the left and right leveling links free to pivot in a direction which raises the right end of the center boom, and a linkage connected to the left latch and to the left wing boom that moves the left latch from contact with the left latch contact surface when the left wing boom is in the left wing working position; and a right sprayer boom lock assembly including a right latch, a right latch contact surface engagable by the right latch to limit pivotal movement of the left and right leveling links in a direction which lowers the left end of the center boom while leaving the left and right leveling links free to pivot in a direction which raises the left end of the center boom, and a linkage connected to the right latch and to the right wing boom that moves the right latch from contact with the right latch contact surfaces when the right wing boom is in the right wing working position.

2. A sprayer boom assembly as set forth in claim 1 wherein the left latch is pivotally attached to the center boom, the left latch contact surface is on the intermediate frame, the right latch is pivotally attached to the center boom and the right latch contact surface is on the intermediate frame.

3. A sprayer boom assembly as set forth in claim 2 wherein the linkage connected to the left latch and to the left wing boom is a cable and the linkage connected to the right latch and to the right wing boom is a cable.

4. A method of operating a sprayer boom assembly with an intermediate frame, a center boom, a left leveling link pivotally attached to the intermediate frame and the center boom, a right leveling link pivotally attached to the intermediate frame and the center boom, a left wing boom pivotally attached to the center boom, a left hydraulic cylinder attached to the center boom and to the left wing boom, a right wing boom pivotally attached to the center boom, a right hydraulic cylinder attached to the center boom and to the right wing boom, a left sprayer boom lock assembly with a left latch and a left latch contact surface, and a right sprayer boom lock assembly with a right latch and a right latch contact surface comprising:

a. activate the left hydraulic cylinder to pivot the left wing boom from a left wing working position to a left wing transport position;

b. activate the left sprayer boom lock assembly to limit pivotal movement of the left and right leveling links and the center boom in a first direction relative to the intermediate frame;

c. activate the right hydraulic cylinder to pivot the right wing boom from a right wing working position to a right wing transport position;

d. activate the right sprayer boom lock assembly to limit pivotal movement of the left and right leveling links and the center boom in a second direction relative to the intermediate frame;

e. activate the left hydraulic cylinder to pivot the left wing boom from the left wing transport position to a left wing working position;

f. deactivate the left boom lock assembly to move the left latch from the path of movement of the left latch contact surface relative to the left latch and free the left and right leveling links and the center boom to pivot relative to the intermediate frame in the first direction;

g. activate the right hydraulic cylinder to pivot the right wing boom from the right wing transport position to the right wing working position; and h. deactivate the right boom lock assembly to move the right latch from the path of movement of the right latch contact surface relative to the right latch and free the left and right leveling links and the center boom to pivot relative to the intermediate frame in the second direction.

5. A sprayer boom assembly including an intermediate frame adapted to be attached to a sprayer boom carrier; a center boom having a left end and a right end, a left wing boom pivotally connected to the left end of the center boom for pivotal movement about a generally horizontal axis between a left wing working position and a left wing folded transport position and a right wing boom pivotally connected to the right end of the center boom for pivotal movement about a generally horizontal axis between a right wing working position and a right wing folded transport position; a left leveling link with an upper end pivotally connected to the intermediate frame for pivotal movement about a left upper axis and a lower end pivotally connected to the center boom for pivotal movement about an axis that is parallel to the left upper axis; a right leveling link with an upper end pivotally connected to the intermediate frame for pivotal movement about a right upper axis that is spaced from the left upper axis and a lower end pivotally connected to the center boom for pivotal movement about an axis that is parallel to the right upper axis and spaced from the axis of the pivotal connection between the lower end of the left leveling link and the center boom; a left hydraulic cylinder pivotally attached to the center boom and to the left wing for pivoting the left wing between the left wing working position and the left wing folded transport position; a right hydraulic cylinder pivotally attached to the center boom and to the right wing for pivoting the right wing between the right wing working position and the right wing folded transport position; at least one sprayer boom lock asembly including at least one latch movable between a disengaged position in which the left and right leveling links are free to pivot and an engaged position in which pivotal movement of the left and right leveling links is restricted; and a boom lock assembly activation linkage connected to the at least one latch and to at least one of the wings, which is movable in response to pivotal movement of the at least one of the wings relative to the center boom.

* * * * *